US009086555B2

(12) United States Patent
Namazue et al.

(10) Patent No.: US 9,086,555 B2
(45) Date of Patent: Jul. 21, 2015

(54) MANUFACTURING METHOD OF OPTICAL FIBER RIBBON, AND OPTICAL FIBER RIBBON MANUFACTURED BY THE MANUFACTURING METHOD

(71) Applicants: FUJIKURA LTD., Koto-ku, Tokyo (JP); NIPPON TELEGRAPH AND TELEPHONE CORPORATION, Chiyoda-ku, Tokyo (JP)

(72) Inventors: Akira Namazue, Edogawa-ku (JP); Yukiko Take, Sakura (JP); Takashi Matsuzawa, Sakura (JP); Ken Osato, Sakura (JP); Naoki Okada, Yotsukaido (JP); Yusuke Yamada, Tsukuba (JP)

(73) Assignees: FUJIKURA LTD., Tokyo (JP); NIPPON TELEGRAPH AND TELEPHONE CORP., Tokyo (JP)

(*) Notice: Subject to any disclaimer, the term of this patent is extended or adjusted under 35 U.S.C. 154(b) by 0 days.

(21) Appl. No.: 14/094,308

(22) Filed: Dec. 2, 2013

(65) Prior Publication Data
US 2014/0112631 A1 Apr. 24, 2014

Related U.S. Application Data

(63) Continuation of application No. PCT/JP2012/063617, filed on May 28, 2012.

(30) Foreign Application Priority Data

Jun. 3, 2011 (JP) ................. 2011-125290

(51) Int. Cl.
G02B 6/44 (2006.01)
(52) U.S. Cl.
CPC ............... *G02B 6/4403* (2013.01); *G02B 6/44* (2013.01); *G02B 6/448* (2013.01); *Y10T 29/49826* (2015.01)

(58) Field of Classification Search
CPC ....... G02B 6/4403; G02B 6/443; G02B 6/448; G02B 6/4405
USPC ........................................... 385/114
See application file for complete search history.

(56) References Cited

U.S. PATENT DOCUMENTS 4,741,594 A * 5/1988 Suzuki .......................... 385/115
5,104,433 A * 4/1992 Chapin et al. .................. 65/432
(Continued)

FOREIGN PATENT DOCUMENTS

| JP | 6-306131 A | 11/1994 |
| JP | 9-243885 A | 9/1997 |

(Continued)

OTHER PUBLICATIONS

International Search Report of PCT/JP2012/063617 dated Sep. 4, 2012 Japanese Office Action JP2011-12590 dated Jan. 8, 2013.
Japanese Office Action JP2011-12590 dated Jan. 8, 2013.
Office Action issued by Australian Patent Office in Australian Patent Application No. 2012263547 mailed May 16, 2014.
(Continued)

*Primary Examiner* — Ryan Lepisto
*Assistant Examiner* — Mary El Shammaa
(74) *Attorney, Agent, or Firm* — Sughrue Mion, PLLC

(57) ABSTRACT

It is an object of the present invention to suppress a coating resin from being shaved off in an event where optical fibers are sent out from a coating dice. When a Young's modulus of ultraviolet curable resins 13 located on outermost layers of optical fibers 3 is 300 MPa or more, and the Young's modulus is 300 MPa to 600 MPa, a plurality of the optical fibers 3 in which friction force measured by the following measurement method is 0.3 N or less are arranged in parallel to one another, these respective optical fibers 3 are fixed to one another intermittently along a longitudinal direction thereof, and adhered portions 5 are formed.

3 Claims, 3 Drawing Sheets

(56) References Cited

U.S. PATENT DOCUMENTS

| | | | |
|---|---|---|---|
| 5,561,730 A | 10/1996 | Lochkovic et al. | |
| 8,548,294 B2 * | 10/2013 | Toge et al. | 385/114 |
| 8,811,783 B2 * | 8/2014 | Tanaka et al. | 385/114 |
| 2003/0201117 A1 * | 10/2003 | Sakabe et al. | 174/115 |
| 2005/0201697 A1 * | 9/2005 | Tanaka et al. | 385/114 |
| 2005/0226573 A1 | 10/2005 | Okuno et al. | |
| 2011/0110635 A1 * | 5/2011 | Toge et al. | 385/102 |

FOREIGN PATENT DOCUMENTS

| | | |
|---|---|---|
| JP | 2010-33010 A | 2/2010 |
| WO | 03/100495 A1 | 12/2003 |

OTHER PUBLICATIONS

Communication dated Jan. 16, 2015, issued by the European Patent Office in application No. 12794117.7.

Communication dated Feb. 23, 2015, issued by the Australian Patent Office in counterpart application No. 2012263547.

Communication dated Nov. 20, 2014 from the Australian Government Intellectual Property Office in counterpart to Application No. 2012263547.

Communication dated Apr. 10, 2015, issued by the Canadian Intellectual Property Office in counterpart Canadian application No. 2,837,689.

* cited by examiner

MANUFACTURING METHOD OF OPTICAL FIBER RIBBON, AND OPTICAL FIBER RIBBON MANUFACTURED BY THE MANUFACTURING METHOD

CROSS-REFERENCE TO RELATED APPLICATION

The application is a Continuation of PCT Application No. PCT/JP2012/063617, filed on May 28, 2012, and claims the benefit of priority from the prior Japanese Patent Application No. 2011-125290, filed on Jun. 3, 2011, the entire contents of which are incorporated herein by reference.

BACKGROUND OF THE INVENTION

The present invention relates to a manufacturing method of an optical fiber ribbon, in which a plurality of optical fibers coated with a resin are arranged in parallel to one another, and these respective optical fibers are fixed to one another intermittently along a longitudinal direction thereof.

An optical fiber ribbon for use in an optical fiber cable is one, in which an optical fiber strand or an optical fiber core wire is formed by coating outer circumferences of optical fiber bare wires (glass fibers) with a resin, a plurality of the optical fiber strands or the like are arranged in parallel to one another, and these are coated with a collective coating layer to be thereby formed into a ribbon shape. In such a way, work of connecting the plurality of optical fibers (optical fiber strands or the like) to one another collectively by fusion or connectors can be optimized.

With regard to the optical fiber ribbon formed by such collective coating as described above, a packaging density thereof is lowered by an amount of such a ribbon-like collective coating resin, and in addition, a bending direction thereof is regulated in terms of design of the optical fiber cable. Therefore, in particular, in an optical fiber cable with a relatively small number of core wires (approximately several ten core wires to hundred core wires), for which requests for a density increase and a diameter reduction are increased, the optical fiber ribbon is disadvantage in comparison with an ultimate packaging form with regard to such a density increase and a diameter reduction as in a simple aggregate of single core wires.

Therefore, for example, in an optical fiber ribbon described in Japanese Patent Laid-Open Publication No. 2010-33010, a plurality of optical fibers arranged in parallel to one another are fixed to one another intermittently (partially) along a longitudinal direction thereof, whereby the fact that the packaging density is lowered and that the bending direction is regulated is suppressed.

Manufacturing of the optical fiber ribbon in which the optical fibers are fixed intermittently to one another is carried out in such a manner that a plurality of optical fibers, which include resin coating layers and are arranged in parallel to one another, are sent out from optical fiber insertion holes open on an outlet surface of a coating dice. In this event, dam members such as shutters and discs are moved between the optical fiber insertion holes adjacent to one another, whereby ejection and damming of the resin for use in such intermittent fixation are carried out alternately.

However, in this case, there is an apprehension that, in the event of being sent out from the optical insertion holes, the optical fibers may be rubbed by outlet portions of the coating dice, and the resin coating on the optical fiber bare wires may be shaved off.

In this connection, it is an object of the present invention to suppress the coating resin from being shaved off in the event where the optical fibers are sent out from the coating dice.

SUMMARY

An invention of claim 1 is a manufacturing method of an optical fiber ribbon, in which a plurality of optical fibers coated with a resin are arranged in parallel to one another, and these respective optical fibers are fixed to one another intermittently along a longitudinal direction thereof, the manufacturing method including: arranging, in parallel to one another, a plurality of optical fibers in which a Young's modulus of the coating resin on outermost layers is 300 MPa or more; and connecting these respective optical fibers to one another intermittently along the longitudinal direction.

An invention of claim 2 is the manufacturing method of an optical fiber ribbon according to claim 1, characterized in that, when the Young's modulus of the coating resin on the outermost layers is 300 MPa or more to less than 600 MPa, a plurality of optical fibers in which friction force of the coating resin on the outermost layers is 0.3 N or less are arranged in parallel to one another, and the respective optical fibers are connected to one another intermittently along the longitudinal direction.

An optical fiber ribbon of an invention of claim 3 is characterized in being manufactured by the manufacturing method of an optical fiber ribbon according to either one of claims 1 and 2.

In accordance with the present invention, slippage of the coating resin in the optical fibers is enhanced in consideration of the Young's modulus of the resin, and accordingly, the coating resin can be suppressed from being shaved off in the event where the optical fibers are sent out from the coating dice.

DESCRIPTION OF EMBODIMENTS

A description is made of an embodiment of the present invention based on the drawings.

Figure 1:
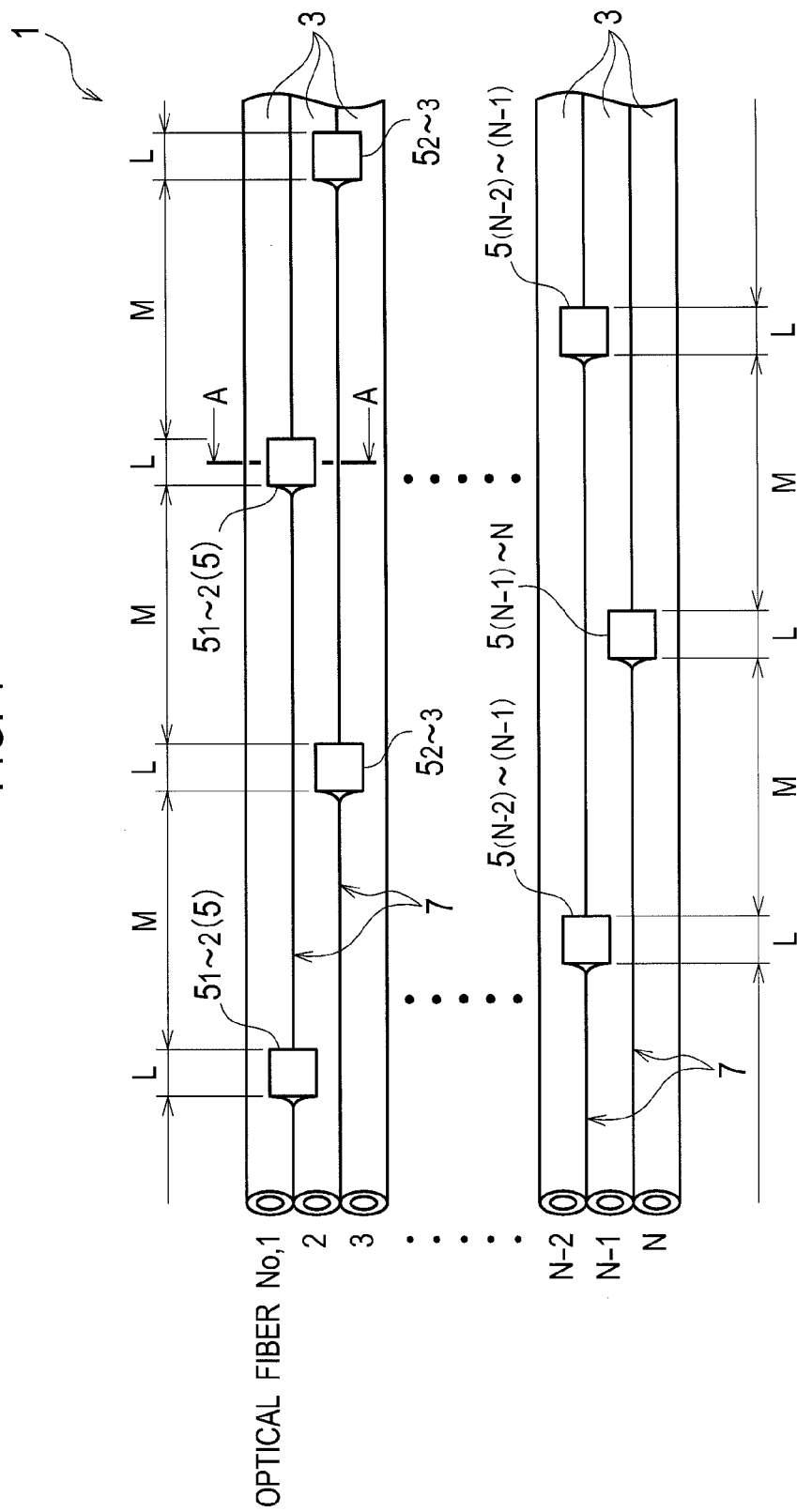
FIG. 1 is a planar perspective view of an optical fiber ribbon, showing an embodiment of the present invention.

As shown in FIG. 1, an optical fiber ribbon (hereinafter, referred to as a ribbon) 1 of an optical fiber cable according to the embodiment of the present invention is configured in such a manner that a plurality of optical fibers 3 are arranged in parallel to one another, and here, is composed of the optical fibers 3 of which number is N in total. Among the N pieces of the optical fibers 3, two optical fibers 3 adjacent to each other are fixed to each other intermittently along a longitudinal direction of the optical fibers 3 concerned by adhered portions 5, each of which serves as a fixing portion for a plurality of spots. Portions between the adhered portions 5 provided in plural along the longitudinal direction are formed as separated portions 7 in which the optical fibers 3 are not adhered to each other.

In this event, adhered portions 51-2 between No. 1 and No. 2 of the optical fibers 3 and adhered portions 52-3 between No. 2 and No. 3 of the optical fibers 3 are located at positions shifted from each other so as to be alternate with each other along the longitudinal direction of the optical fibers 3. In a similar way, adhered portions 5(N−2)−(N−1) between No. N−2 and No. N−1 of the optical fibers 3 and adhered portions 5(N−1)−N between No. N−1 and No. N of the optical fibers 3 are located at positions shifted from each other so as to be alternate with each other along the longitudinal direction of the optical fibers 3. As described above, with regard to the adhered portions 5 of the mutual two optical fibers 3, those adjacent to each other in a direction where the optical fibers 3 are arranged in parallel to each other are located at the positions shifted from each other so as to be alternate with each other along the longitudinal direction of the optical fibers 3.

Figure 2:
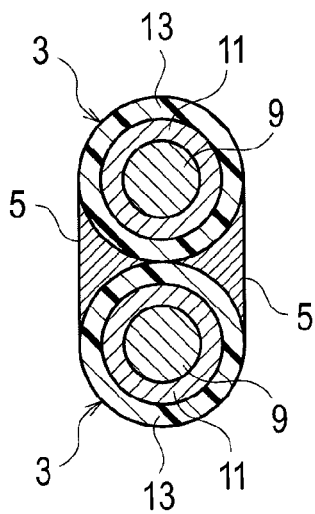
FIG. 2 is an enlarged cross-sectional view taken along a line A-A of FIG. 1.

FIG. 2 is a cross-sectional view taken along a line A-A of FIG. 1, in which each of the optical fibers 3 is an optical fiber strand composed of: a quartz glass fiber 9; a soft resin 11 that coats an outer circumference of the glass fiber 9; and an ultraviolet curable resin 13 that further coats an outer circumference of the soft resin 11. Then, the mutual two optical fibers 3 are connected and fixed to each other by the each of above-described adhered portions 5 formed on both front and back sides thereof. Here, the ultraviolet curable resin 13 described above is a resin of outermost layers in a state before the optical fibers 3 adjacent to each other are fixed to each other intermittently by the adhered portions 5. Note that, in place of the optical fiber strands described above, the optical fibers 3 may be optical fiber core wires in which outer circumferences of the optical fiber strands are coated with a resin such as colored ink. In this case, the resin such as the colored ink serves as the resin of the outermost layers of the optical fiber core wires in the state before the optical fibers 3 are fixed to each other intermittently by the adhered portions 5.

For manufacture of the ribbon 1 in which the optical fibers 3 are thus fixed intermittently, a ribbon manufacturing apparatus including a coating dice 17 (FIG. 4) to be described later is used.

Here, in this embodiment, slippage of the ultraviolet curable resins 13 is enhanced in order to suppress the ultraviolet curable resins 13 from being rubbed and shaved off at an outlet portion of a coating dice 17 in the event where the optical fibers 3 are sent out from the coating dice 17 concerned at the time of manufacturing the ribbon 1 by the ribbon manufacturing apparatus described above.

Specifically, with regard to each of the ultraviolet curable resins 13 of the optical fibers 3 here, the fact that a Young's modulus thereof is 300 MPa or more is an essential requirement, and in addition, when the Young's modulus is 300 MPa or more to less than 600 MPa, friction force measured by the following measurement method is set at 0.3 N or less.

A description is made below of a measurement method of the friction force. First, as shown in FIG. 3(a), a single ring 30a with a diameter of 7 cm is formed of a predetermined-length optical fiber specimen 30 for evaluation, which is used for each of the optical fibers 3, and an end portion 30b on one end side of this optical fiber specimen 30 is inserted into the ring 30a so as to make a knot. As shown in FIG. 3(c), this insertion work is performed one more time, that is, is repeated twice, and a contact portion 30d as shown in FIG. 3(d), in which portions of the ultraviolet curable resin 13 are brought into contact with each other, is formed.

Then, in a state of FIG. 3(d) described above, the end portion 30b on one end side with respect to the ring 30a of the optical fiber specimen 30 and an end portion 30c on other end side with respect thereto are individually grasped by a tensile testing machine (not shown), and are pulled in a direction (up-and-down direction in FIG. 3(d)) of being spaced apart from each other so that the diameter of the ring 30a can be reduced. At this time, a pulling speed is set at 5 mm/min, and a pulling time is set at 2 minutes, and an average load value (surface friction force) of force at the time of this pulling is set at the friction force of the ultraviolet curable resin 13.

Table 1 shows relationships between the friction force (N) and the Young's modulus (MPa). Here, the ribbon 1 is manufactured by the ribbon manufacturing apparatus to be described later, and the case where a shaved chip of the ultraviolet curable resin 13 on the outermost layer is generated on the outlet portion of the coating dice 17 is denoted by "x", and the case where the shaved chip concerned is not generated thereon is denoted by "○".

TABLE 1

| | | Young's modulus (MPa) | | | | | | | |
|---|---|---|---|---|---|---|---|---|---|
| | | 150 | 200 | 300 | 400 | 500 | 600 | 800 | 1500 |
| Friction force (N) | 0.05 | x | x | ○ | ○ | ○ | ○ | ○ | ○ |
| | 0.1 | | | ○ | ○ | ○ | ○ | ○ | |
| | 0.2 | x | x | | | | | | ○ |
| | 0.3 | | x | ○ | ○ | ○ | ○ | ○ | ○ |
| | 0.4 | x | | x | x | x | ○ | | |
| | 0.5 | x | x | x | | x | ○ | ○ | ○ |

Note that, in the ribbon manufacturing apparatus at this time, a feeding speed of the optical fiber 3 is set at 120 m/min, the number of revolutions of each disc 27 as a dam member is set at 400 rpm, a length L of each adhered portion 5 is set at 100 mm, and a length M of each separated portion 7 is set at 200 mm, whereby a length of a pitch between the adhered portions 5 is set at 300 mm.

In accordance with Table 1, from a viewpoint of the Young's modulus of the ultraviolet curable resin 13, there are cases of "○" when the Young's modulus is 300 MPa or more, and there are not cases "○" when the Young's modulus is less than 300 MPa. Hence, it is essential that the Young's modulus be at least 300 MPa or more.

Meanwhile, from a viewpoint of the friction force, in the case where the friction force exceeds 0.3 N under such a condition where the Young's modulus is 300 MPa or more, there are cases of "x" when the Young's modulus falls down below 600 MPa, and there are not cases "x" when the friction force is 0.3 N or less. Therefore, in the case where the Young's modulus is 300 MPa or more to less than 600 MPa, it is necessary that the friction force be 0.3 N or less.

Based on the above, in order to realize the case where the shaved chip of the ultraviolet curable resin 13 on the outermost layer is not generated on the outlet portion of the coating dice 17, that is, in order to make it possible to suppress the coating resin from being shaved off at the outlet portion of the coating dice 17 in the event where each optical fiber 3 is sent out from the coating dice 17 concerned, the following conditions become necessary.

With regard to the ultraviolet curable resin 13, it is essential that the Young's modulus thereof be at least 300 MPa or more, and in addition, when the Young's modulus is 300 MPa or more to less than 600 MPa, the friction force measured by the measurement method described above is 0.3 N or less.

In general, an ultraviolet curable resin for use in the ultraviolet curable resins 13 contains, as basic constituent components, a radical polymerizable oligomer containing an unsaturated group (for example, an acryloyl group), a reactive monomer as a reactive diluent, and a polymerization initiator.

Moreover, to the ultraviolet curable resin concerned, required amounts of a variety of additives and the like are blended, the additives including a pigment, an ultraviolet absorber, a light stabilizer, a polymerization inhibitor, a silane coupling agent, a leveling agent, a lubricant, an oxidation stabilizer, an antioxidant, a storage stabilizer and the like.

Moreover, in the ultraviolet curable resin, mainly, a type, structure and molecular weight of the radical polymerizable oligomer, and types of the reactive monomer, the polymerization initiator and the variety of additives are selected, and further, a compounding ratio of the radical polymerizable oligomer, the reactive monomer, the polymerization initiator and the variety of additives is adjusted, whereby it is possible to adjust a variety of characteristics.

The ultraviolet curable resin as described above is used for the ultraviolet curable resin 13, whereby, also with regard to a Young's modulus and friction force of the resin on the outermost layer of each optical fiber 3 after the resin concerned is cured, those with desired characteristics adapted to this embodiment can be obtained.

Figure 4:
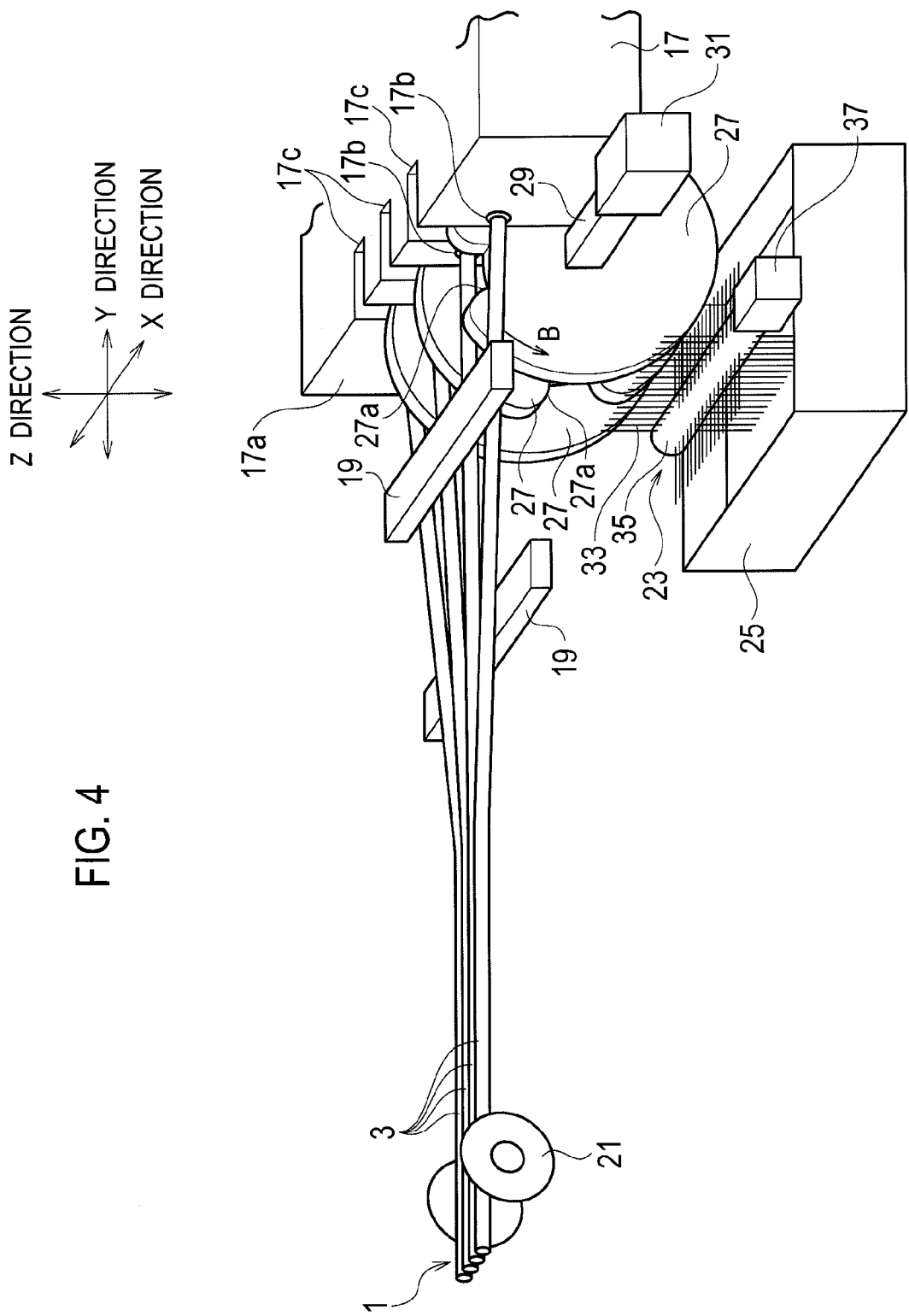
FIG. 4 is a perspective view showing a manufacturing apparatus of the optical fiber ribbon of FIG. 1.

Next, a description is made of the ribbon manufacturing apparatus that manufactures the ribbon 1 described above. This ribbon manufacturing apparatus includes the above-described coating dice 17, which performs a fiber arraying/resin supplying process for arraying the plurality of optical fibers 3 as shown in FIG. 4 and supplying the above-described ultraviolet curable resin that is uncured.

Moreover, in front of the coating dice 17 in a feeding direction of the optical fibers 3, the ribbon manufacturing apparatus includes: for example, two ultraviolet spot lamps 19 as resin curing energy irradiation devices which perform a resin curing process for curing the uncured ultraviolet curable resin by energy irradiation; and a line concentrating roll 21 that concentrates the plurality of optical fibers 3 sent out from the coating dice 17. Moreover, below the coating dice 17, resin removing means 23 and brush cleaning means 25 are installed.

The coating dice 17 includes, in an inside thereof, a resin reservoir (not shown) that reserves the uncured ultraviolet curable resin. On an outlet surface 17a of the coating dice 17, a plurality of optical fiber insertion holes 17b, which communicate with the resin reservoir, are opened. From the plurality of optical fiber insertion holes 17b, the plurality of optical fibers 3, which have passed through the resin reservoir, are arrayed and sent out. Moreover, the optical fiber insertion holes 17b adjacent to one another communicate with one another through narrow communication holes (not shown).

With such a configuration, at the time of being sent out from the respective optical fiber insertion holes 17b, the plurality of optical fibers 3 are cured after the uncured ultraviolet resin is coated on surfaces of the outer circumferences of the ultraviolet curable resins 13 as the resins of the outermost layers of the respective optical fibers 3, whereby the adhered portions 5 are formed, and the ribbon 1 is thereby formed. That is to say, in the ribbon 1, the adhered portions 5 located on the more outer circumferences of the ultraviolet curable resins 13 become the resins of the outermost layers.

On the outlet surface 17a of the coating dice 17, there are individually provided disc-oriented groove portions 17c which penetrate the coating dice 17 between the respective optical fiber insertion holes 17b adjacent to one another and in a Z-direction (up-and-down direction in FIG. 4) perpendicular to an X-direction (direction where the plurality of optical fibers 3 are arranged in parallel to one another) in FIG. 4. The respective disc-oriented groove portions 17c intersect the above-described communication holes (not shown) formed between the optical fiber insertion holes 17b adjacent to one another, and it is made possible to eject the ultraviolet curable resin from the optical fiber insertion holes 17b through the communication holes.

A plurality of the discs 27 as the dam members are arranged in a state where parts (upper portions in a rear side in the feeding direction of the optical fibers 3) thereof enter the respective disc-oriented groove portions 17c. All of center portions of the plurality of discs 27 are fixed to the same rotation shaft 29, and this rotation shaft 29 is rotationally driven by a first drive source 31. When the rotation shaft 29 rotates by power of the first drive source 31, the plurality of discs 27 rotate integrally with one another in a direction of an arrow B.

Notched portions 27a are provided on outer circumferential portions of the respective discs 27. Rotation orbits of the notched portions 27a are set so that the notched portions 27a can pass through positions corresponding to the above-described insertion holes (not shown) between the optical fiber insertion holes 17b adjacent to one another.

Hence, at positions where spots of the discs 27, which are other than the notched portions 27a, are interposed between the disc-oriented groove portions 17c between the optical fiber insertion holes 17b adjacent to one another, the discs 27 stops the ejection of the ultraviolet curable resin, which is made through the communication holes from the optical fiber insertion holes 17b adjacent to the discs 27 on both sides. Meanwhile, when the notched portions 27a of the discs 27 are located at the disc-oriented groove portions 17c between the optical fiber insertion holes 17b adjacent to one another, the ultraviolet curable resin is ejected through the communication holes from the optical fiber insertion holes 17b adjacent to the discs 27.

Hence, the plurality of discs 27 in which rotation phases of the notched portions 27a are different from one another are attached, and the plurality of discs 27 are rotated, whereby, as shown in FIG. 1 described above, the adhered portions 5 made of the ultraviolet curable resin and the separated portions 7 can be formed individually between the optical fibers 3 adjacent to one another. As a result, it is made possible to manufacture the ribbon 1 in which the optical fibers 3 adjacent to one another are fixed to one another intermittently along the longitudinal direction.

The resin removing means 23 includes: a brush 33 as a scraping member extended radially from a rotation center thereof; a rotation shaft 35 to which a center spot (base end portion) of the brush 33 is fixed; and a second drive source 37 that rotationally drives the rotation shaft 35. The brush 33 that rotates contacts outer circumferential edge portions of the respective discs 27, and scrape off the ultraviolet curable resin stuck to the respective discs 27.

In this embodiment, the brush cleaning means 25 is a solution vessel in which a detergent such as alcohol is housed, and this solution vessel (brush cleaning means) 25 is installed on a rotation orbit of the brush 33. When such a rotating brush 33 contacts the discs 27, the ultraviolet curable resin stuck to the surfaces of the discs 27 is shaved off by the brush 33, and the ultraviolet curable resin stuck to the brush 33 is removed by the detergent in the solution vessel 25.

In a space from the outlet surface 17a of the coating dice 17 to a spot where the optical fibers 3 are concentrated so as to be arranged in parallel to one another and are brought into contact with one another, at two spots thereof, the ultraviolet spot lamps 19 are arranged in a Y-direction (feeding direction of the optical fibers 3) corresponding to the longitudinal direction of the optical fibers 3. By the ultraviolet spot lamps 19 located at two spots, resin curing energy necessary to cure the uncured ultraviolet curable resin is irradiated.

Note that such installation positions and number of the ultraviolet spot lamps 19 are not limited to those shown in FIG. 4, and for example, three or more of the ultraviolet spot lamps 19 may be arranged at appropriate positions between the coating dice 17 and the line concentrating roll 21. Moreover, such an irradiation direction of the ultraviolet ray is not limited to the Z-direction in FIG. 4, and may be other directions such as the X-direction. In this event, with regard to the irradiation direction of the ultraviolet ray, different directions may be combined with one another. Furthermore, the ultraviolet lamps are not limited to those of the spot type, and those with a relatively long shape, such as fluorescent tubes, may be used. Then, installation positions, number and type of these ultraviolet lamps are changed appropriately, and in addition, an ultraviolet irradiation dose is also adjusted appropriately, whereby the curing of the uncured ultraviolet curable resin is made sufficient.

In the event where the optical fibers 3 are sent out from the optical fiber insertion holes 17b at the time of manufacturing the ribbon 1 by the ribbon manufacturing apparatus having such a configuration, outer circumferential surfaces of the optical fibers 3 are rubbed by circumferential edges of opening portions of the optical fiber insertion holes 17b as the outlet portions of the coating dice 17. With regard to factors why the outer circumferential surfaces concerned are rubbed, such rubbing is considered to necessarily occur because the optical fibers 3 swing because of vibrations caused by the rotation of the discs 27, vibrations when the notched portions 27a of the discs 27 pass through such coupling holes of the fiber insertion holes 17b, and pulsation (vibrations) caused by a minute change of the coating amount of the ultraviolet curable resin.

At that time, in this embodiment, with regard to the ultraviolet curable resins 13 of the optical fibers 3, as mentioned above, it is essential that the Young's modulus thereof be 300 MPa or more. In addition, when the Young's modulus is 300 MPa or more to less than 600 MPa, the friction force measured by the above-described measurement method is set at 0.3 N or less, whereby the slippage of the ultraviolet curable resins 13 is enhanced.

Therefore, even if the optical fibers 3 are rubbed by the outlet portions of the coating dice 17, in the ultraviolet curable resins 13 made slippery by enhancing the slippage, the occurrence of the shaved chip can be suppressed as shown in Table 1 mentioned above, and the ultraviolet curable resins 13 can be suppressed from being shaved off.

Note that, in the ribbon manufacturing apparatus shown in FIG. 4, the discs 27 are used as the dam members; those other than the discs 27, for example, shutters moving up and down, can also be used in a similar way to those described in the foregoing Patent Literature 1.

Figure 3:
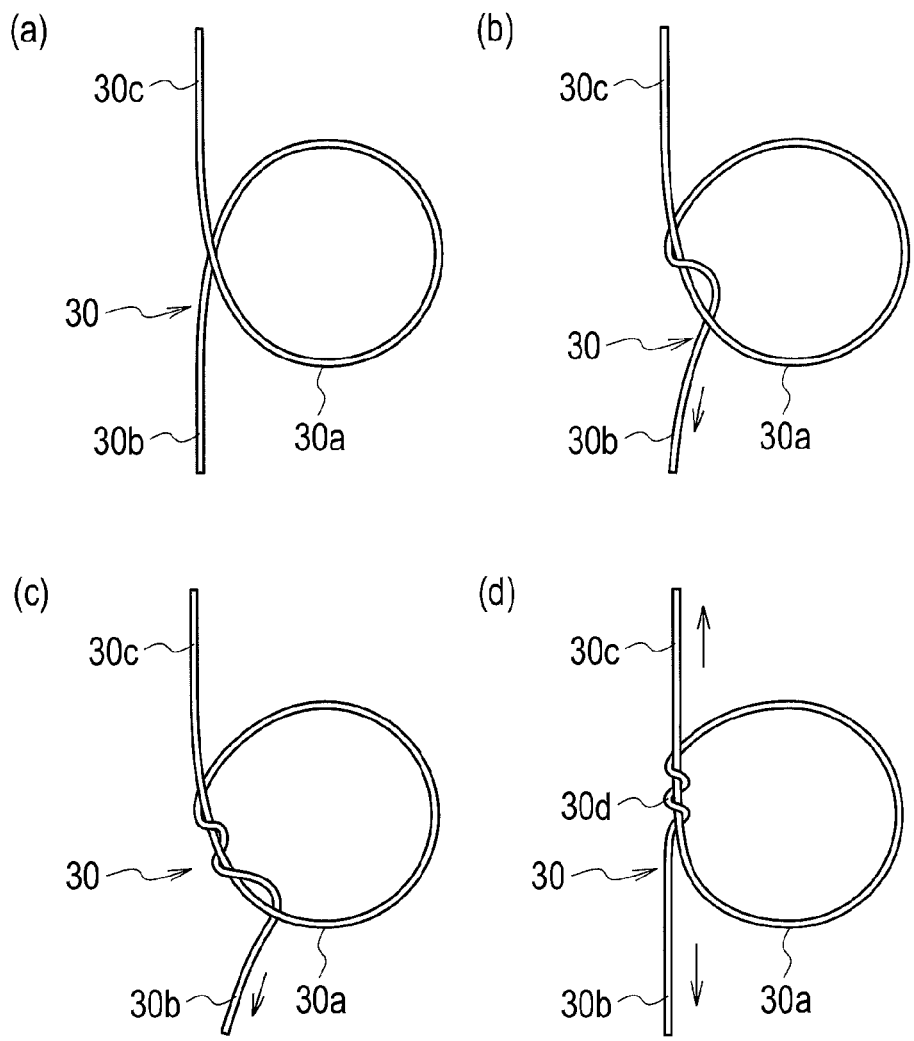
FIGS. 3(a) to 3(d) are explanatory views showing a measurement method of friction force of an optical fiber sequentially from FIG. 3(a) to FIG. 3(d).

Moreover, in this embodiment, in the measurement method of the friction force, the diameter of the ring 30a is set at 7 cm as described with reference to FIG. 3; however, may be a little smaller or larger than 7 cm. However, when the diameter of the ring 30a is too small, then a fracture of the optical fiber specimen 30 is brought about, and this is not preferable. On the contrary, when the diameter of the ring 30a is too large, then it becomes difficult to set the ring 30a onto a testing machine to thereby deteriorate workability, and this is not preferable. By setting the diameter concerned at 7 cm, the fracture of the optical fiber specimen 30 is suppressed, and in addition, it is made easy to set the ring 30a onto the testing machine, and based on these, measurement with higher accuracy is enabled.

Furthermore, in this embodiment, in the measurement method of the friction force, the contact portion 30d is formed by repeating twice the work of inserting the end portion 30b on one end side of the optical fiber specimen 30 into the ring 30a as described with reference to FIG. 3; however, the number of times that the work concerned is performed is not limited to twice. However, if the number of times concerned is too large, then the workability is deteriorated, and it becomes difficult to perform the high-accuracy measurement, and accordingly, this is not preferable. On the contrary, if the number of times concerned is only once, then it becomes difficult to perform the high-accuracy measurement, and accordingly, this is not preferable.

Moreover, in this embodiment, in the measurement method of the friction force, as described with reference to FIG. 3, the end portion 30b on one end side of the optical fiber specimen 30 and the end portion 30c on the other end thereof are pulled at the speed of 5 mm/min for 2 minutes; however, some errors are allowed for these puling speed and time. These end portions 30b and 30c are pulled at the speed of 5 mm/min for 2 minutes, whereby measurement with higher accuracy is enabled.

What is claimed is:

1. A manufacturing method of an optical fiber ribbon, in which a plurality of optical fibers are arranged in parallel to one another, wherein each of the plurality of optical fibers is coated with a coating resin, and the plurality of optical fibers are fixed to one another intermittently along a longitudinal direction thereof, the manufacturing method comprising:

coating the plurality of optical fibers, each of which is coated with the coating resin, with an uncured ultraviolet resin intermittently along the longitudinal direction at a time of sending the plurality of optical fibers out from a coating dice; and connecting the plurality of optical fibers to one another intermittently along the longitudinal direction by curing the uncured ultraviolet resin to form adhered portions, wherein a Young's modulus of the coating resin is 300 MPa or more.

2. The manufacturing method of an optical fiber ribbon according to claim 1, wherein, when the Young's modulus of the coating resin is 300 MPa or more to less than 600 MPa, a friction force of the coating resin of each of the plurality of optical fibers is 0.3 N or less.

3. An optical fiber ribbon manufactured by the manufacturing method according to claim 1.

* * * * *